Dec. 25, 1951 H. J. KISTNER 2,580,303

STORAGE DEVICE FOR RECORD CONTROLLED COMPUTERS

Filed June 25, 1949 5 Sheets-Sheet 1

INVENTOR
HAROLD J. KISTNER
BY Robert S. Dunham
ATTORNEY

STORAGE DEVICE FOR RECORD CONTROLLED COMPUTERS

Filed June 25, 1949 5 Sheets-Sheet 2

INVENTOR
HAROLD J. KISTNER
BY Robert S. Dunham
ATTORNEY

STORAGE DEVICE FOR RECORD CONTROLLED COMPUTERS

Filed June 25, 1949 5 Sheets-Sheet 3

INVENTOR
HAROLD J. KISTNER
BY Robert S. Dunham
ATTORNEY

INVENTOR
HAROLD J. KISTNER
BY Robert S. Dunham
ATTORNEY

INVENTOR
HAROLD J. KISTNER
BY Robert S. Dunham
ATTORNEY

Patented Dec. 25, 1951

2,580,303

UNITED STATES PATENT OFFICE 2,580,303

STORAGE DEVICE FOR RECORD CONTROLLED COMPUTERS

Harold J. Kistner, Union, N. J., assignor to International Business Machines Corporation, New York, N. Y., a corporation of New York Application June 25, 1949, Serial No. 101,449

9 Claims. (Cl. 235—61.6)

This invention relates to storage devices and more particularly the invention relates to an electrical storage device for use in connection with electric accounting and computing machines, and it has particular utility in accounting and computing systems which operate under control of perforated record cards.

Information from a source such as a perforated record card may be sensed concurrently, or it may be sensed column by column. Accordingly, provision should be made for either a concurrent entry or column by column entry into a data storage device. Information read out from the storage device may be read out of storage by a concurrent readout, or it may be read out column by column depending upon the type of device which is to receive the stored information.

Accordingly, storage devices of this class must be functionally adapted to store information and to make available such stored information in a plurality of different ways. In the example herein given, information may be entered column by column and read out of the storage device concurrently, or it may be entered into the storage device concurrently and read out column by column. The term concurrent entry or readout designates an operation wherein like digits of a given field are entered simultaneously or read out simultaneously, while the term column by column entry or readout designates an operation wherein all information in a single column irrespective of value representation is entered at one time or read out at one time.

It is, therefore, the general object of the invention to provide a storage unit which is applicable to the various entry and readout conditions, and it is a specific object of the invention to provide a storage device which is current responsive and electromagnetically operated.

In its present embodiment the storage unit comprises a plurality of storage elements, each of which includes a plurality of contact assemblies which are adapted to be flexed into closed position by operation of storage unit magnets so that selected closed contacts of such closed contact assemblies thereafter may be latched into so-called stored position upon operation of electromagnetically operated latching devices which traverse the storage elements. Latched contact points constitute storage positions which are adapted to form part of control circuits for subsequent use, which circuits are completed at predetermined times upon further operation of readout mechanism included in the control system.

Further objects, advantages and features of the storage device and the system for its control will become clear as the following specification is read in light of the drawings in which.

Figure 1:
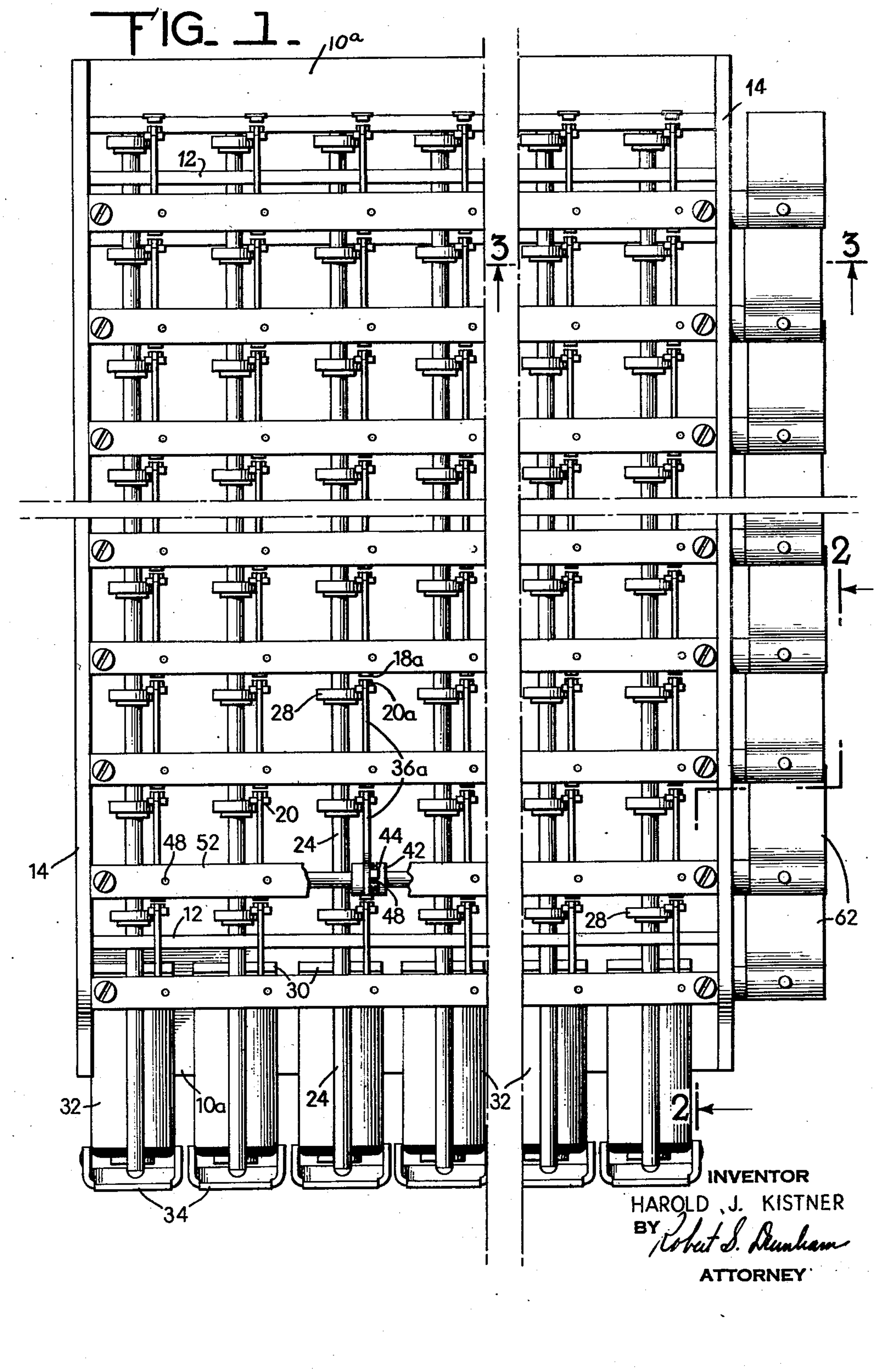
Figure 1 is a plan view of the storage device.

The storage device constituting the main mechanical features of this invention is mounted in a base frame which consists of a pair of end frame members 10, each having a laterally extending bottom flange 10*a* and a vertically extending flange 12, the end frame members being attached in any suitable means at their ends to opposite ends of side frame members 14. The frame structure constitutes a generally rectangular construction in and on which the operative elements are mounted. Mounted between the side walls 14 in substantially parallel, spaced relation are a plurality of storage elements 16, each of which includes a plurality of substantially equally spaced contact assemblies. Inasmuch as the storage device is designed to store information from a given field of a perforated record card, there has been provided herein twelve storage elements 16 to correspond to the twelve index point positions of a record card column. The number of contact assemblies of a given storage element is dependent upon the size of the record bearing field of a perforated record card from which information is to be stored. Herein, for purposes of illustration, a plurality of contact assemblies have been provided along the length of each storage element. This, therefore, adapts the device to the storage of information from a record card field consisting of columns corresponding in number to the number of contact assemblies in each storage element.

Each contact assembly includes a pair of resilient contact strips 18 and 20 which are mounted in spaced relation to each other on opposite faces of an insulating strip 16*a*. The contact strips 18 and 20 carry contact points 18*a* and 20*a*, respectively, at their free, upper ends. Each contact strip 20 is provided with an extension above its contact point 20a and the free end thereof is bent over to form a latch flange 22, which is adapted to engage with a contact point latching device, as will be more fully pointed out hereinafter. The lower free ends of the contact strips constitute terminals by means of which the storage device may be wired into a control system. The contact assemblies of one storage element are in substantial alignment with the corresponding contact assemblies of the other storage elements of the device. This, in effect, places the aligned contact points of the several storage elements into the operative range of a common actuator. Such aligned contact assemblies constitute an electrical storage zone.

Each storage zone has been provided with operating means for simultaneously closing all of the contact assemblies therein. A particular description of one operating means will suffice, since the operating mechanism for the several zones is identical. The means herein disclosed consists of a rod 24 which is mounted for sliding movement in guide passages 26 formed through the upper portions of the upstanding base flanges 12. Fixed to the rod 24 in proximity to each contact strip 20 of the contact assemblies of a storage zone are abutment collars 28 which are adapted to abut the resilient contact strips 20 and which effectively flex the contact strips 20 to bring the contact points 18a and 20a into conducting relation when the rod 24 is reciprocated against the tension of the contact strips 20. This direction is from left to right as viewed in Fig. 2.

The storage device, as hereinbefore mentioned, is adapted for use in automatic control systems, and therefore there has been provided herein a current sensitive mechanism in operative relation to each of the sliding rods 24 for selectively operating the rods. In particular, the lateral flange 10a at one end of the storage device frame has attached thereto yokes 30 on each one of which is mounted an electromagnet 32. One leg 30a of the yokes 30 has pivoted thereto an armature 34, which may be alternately attracted and released by the core of its associated electromagnet 32. The armatures 34 are of sufficient length so that their free end portions lie in contact with the outer end of the associated reciprocating rod 24. It follows, therefore, that when an armature 34 is attracted to the core of its electromagnet 32, when such magnet is energized, the armature will move its reciprocating rod 24 from left to right and the abutments 28 fixed to the sliding rod will flex the resilient contact strips 20 of that zone to bring the contact points 18a and 20a into conducting relation. Selected contact assemblies may be latched in closed position after the points thereof have been brought into contact with each other as hereinbefore described. Thereafter, the resilience of the unlatched contact strips 20 will return the sliding rod 24 to its normal position when the electromagnet 32 is deenergized and the armature 34 thereof is released.

Figure 3:
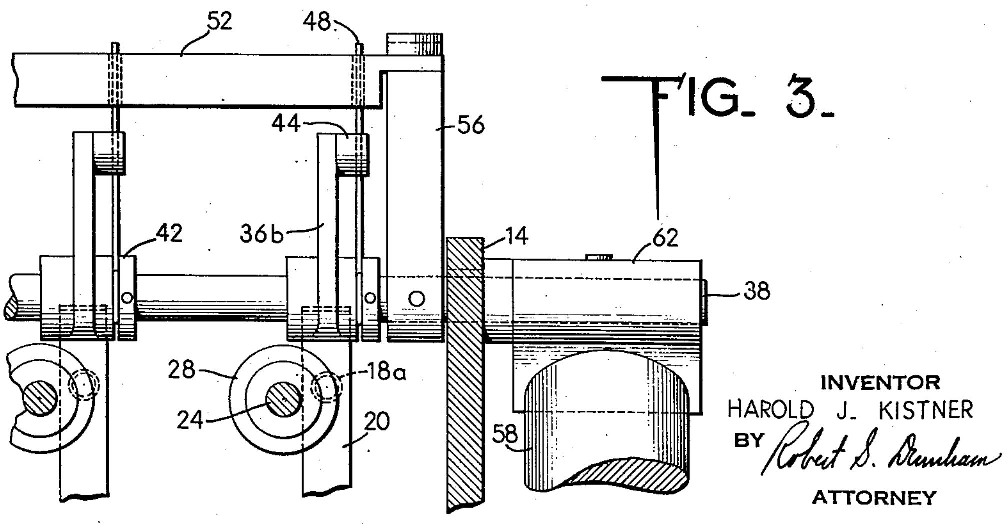
Fig. 3 is a sectional view taken on line 3—3 of Fig. 1.

Each storage element has a plurality of contact assembly latches 36 associated therewith. In fact, a separate latch is provided for each contact assembly along the length of the storage unit. Herein the latches 36 are illustrated as consisting of generally L-shaped latching members having a bearing passage at the junction of the legs of the L. By means of the bearing passages the latching members may be supported for rocking movement on a shaft 38, which is mounted in the side walls 14 of the storage device frame structure, the rods 38 extending generally parallel with respect to the storage elements associated therewith. Each latch member 36 has a horizontally extending leg 36a and a vertically extending leg 36b. The leg 36a is shouldered at its free end to provide a latching lip 40 adapted to engage under the latch flange 22 of its associated contact strip 20. Spacing collars 42 are fixed to the shaft 38 (see Fig. 3) in order to maintain the latch members in their position of substantial alignment with the associated contact strip 20.

The upwardly extending leg 36b of the latch member 36 has a laterally extending boss 44 which has a face slot 46 therein to accommodate a resilient wire 48. The wire 48 has one end thereof in encircling engagement with the shaft 38 and the other end thereof in engagement with an aperture 50 extending through a flange 52 of a common latch bail 54. Each storage element has its associated common latch bail so that contact assemblies of the several units may be latched in any desired order.

The common latch bail 54 consists of the flange 52 which extends parallel with respect to the storage elements 16 and generally coaxially with respect to the shaft 38. The flange 52 is supported at its ends on supporting legs 56 which are fixed to the shaft 38, and consequently rock therewith when the shaft is rotated about its axis. It will be seen, therefore, that the latch members 36 are free to rotate on the shaft 38, but that the latch bail 54 is fixed to the shaft for rotation therewith. The resilient connectors 48, therefore, constitute an operating connection between the latch members 36 and the latch bail 54. Furthermore, since the wire 48 is resilient, it in effect constitutes a lost-motion connection between the latch members 36 and the latch bail 54. As a result of such lost-motion connection, it is possible to rock the latch bail 54 about the axis of the shaft 38 and depress the latch lip 40 of the latch members below the plane of the latch flange 22 of a flexed resilient contact strip 20, so that the latch flange 22 will engage the lip 40 of the latch member when the contact strip 20 is released upon deenergization of the electromagnet 32. At the same time the lost-motion connection permits the latch member 36 to yield in the event one or more of the resilient contact strips 20 have not been flexed by the operation of the associated operating rod 24. In this event, the free end of the latch member leg 36a will engage the top of the latch flange 22 of such non-operated contact strip and the wire 48 will flex sufficiently to allow the bail 54 to rock far enough for effectively engaging the latch lip 40 under the latch flanges of any of the contact strips that have been flexed into latching position.

Because the device is to be used in an electric control system designed for automatic operation, it is important that current sensitive means be provided for selectively rocking the shafts 38, and their associated latch bails 54, into contact latching position. This end is attained by mounting electromagnets 58 on mounting brackets 60 fixed to one of the side members 14 of the frame structure. The shafts 38 extend sufficiently beyond the side member 14 of the frame structure on which the magnets 58 are attached to permit an armature 62 to be attached to the extending end thereof. The armature 62 of each shaft extends into operative relation with the core of its associated magnet 58 so that when the magnet 58 is energized, the armature 62 will be attracted to the core of the magnet and the shaft 38 will be rocked through a distance sufficient to render the latching members 36 effective for their intended purpose. Herein the resilient nature of the spring wire connections 48 influence the return of the latch bail 54 to its normal upright position. Since the shaft 38, the latch bail 54 and the armature 62 move as a unit, the armature 62 will rock out of contact with the core of its associated magnet when the magnet is deenergized.

Suitable control connections are made to the storage zone magnets 32 and to the latch bail magnets 58, so that the storage zone magnets 32 are always energized before the latching bail magnets. Furthermore, the control system will be such that the magnets are deenergized in the same order, that is to say, the magnets 32 will be deenergized before the magnets 38. As will appear hereinafter, either set of magnets may be sequentially operated or selectively operated as conditions may require.

The operation of the structure thus far described may be briefly summarized to render its meaning perfectly clear before proceeding with a description of the operation of the storage device in a perforated record card controlled system.

Figure 2:
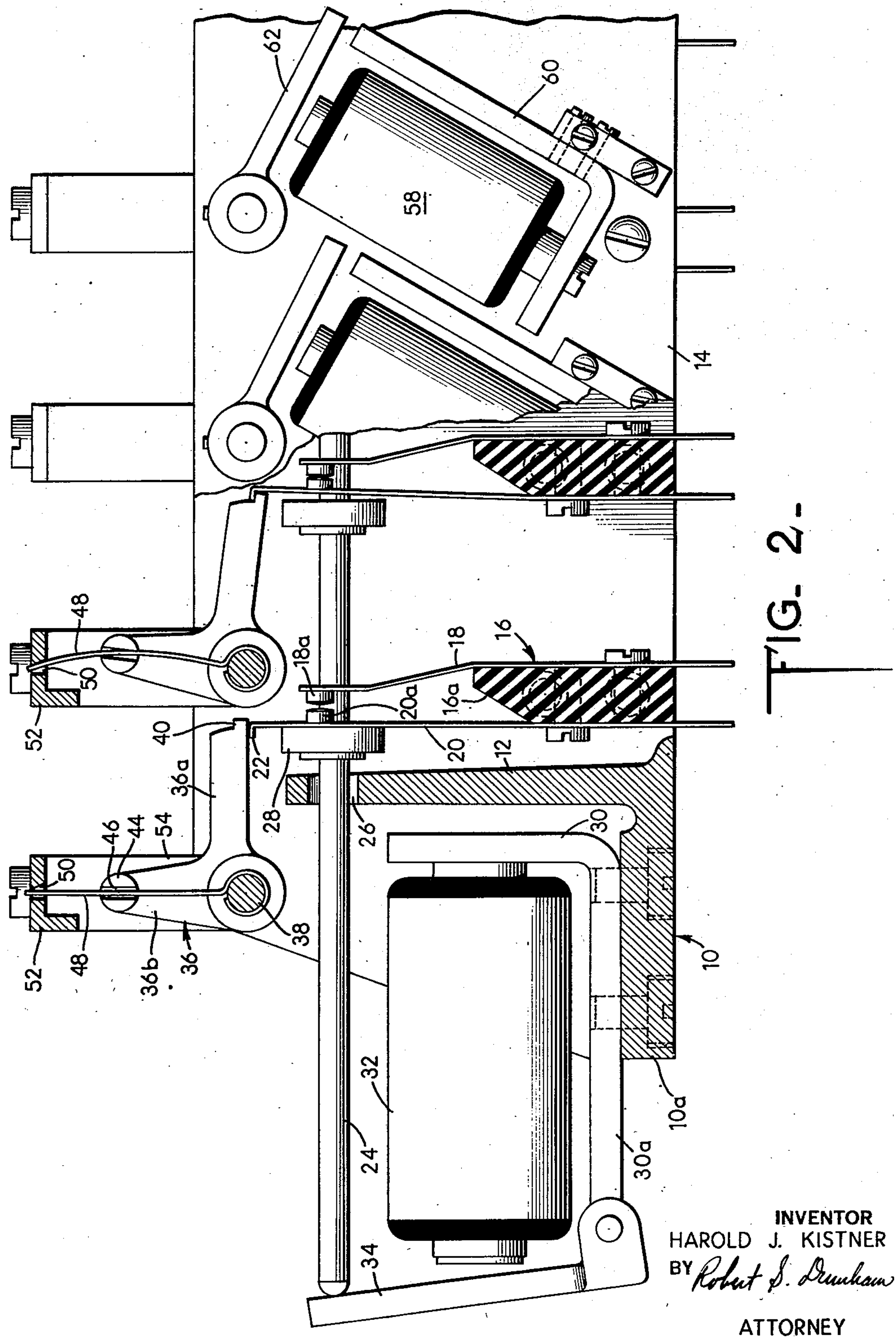
Fig. 2 is a sectional view taken on line 2—2 of Fig. 1.

When an electromagnet 32 is energized, the armature 34 thereof is attracted to the core of the magnet, and the armature reciprocates the sliding rod 24 to the right as viewed in Fig. 2 of the drawings. When the rod 34 is reciprocated, the abutment collars 28 thereon will flex the resilient contact strips 20 of the related storage zone, thereby bringing the contact points 18*a* and 20*a* into engagement with each other. The impulse on the magnet 32 is of sufficient duration to hold the sliding rod 24 in its inner position to permit the contact assembly latching mechanism to come into operation. When one or more of the electromagnets 58 are energized, the armature 62 thereof will be attracted to the magnet core and the associated latching bail 54 will be rocked in a clockwise direction about the axis of the shaft 38. The rocking movement transmitted through the flexible connecting wires 48 will serve to rotate the latch members 36 in a clockwise direction about the shaft 38, thereby positioning the latching lip 40 thereof under the latching flange of flexed contact strips 20. As soon as the electromagnet 58 has performed its intended function, the electromagnet 32 will become deenergized, permitting the armature 34 to drop away from its core, thereby releasing the sliding rod 24, which will return to its normal position at the left under the influence of the unlatched contact strips of the storage zone. Immediately thereafter the latching magnets 58 will be deenergized and the latching bails 54 will return to their normal upright position.

The several storage elements may be employed to represent digits of a given field of record data, as for example, in Fig. 2 the storage elements may be presumed to be representative of the digits 9876 reading in order from left to right. In accordance with the statement of operation hereinabove made, it may be presumed that as illustrated in Fig. 2 it was intended to latch into contacting position the contact points of a storage zone representative of the digit 8. This digital representation is effected in the storage device by energizing the electromagnet 58 which is in control of the shaft 38 at the 8 digital position. Thus, when the sliding rod 24 is reciprocated to the right under the influence of the storage zone magnet 32, only the electromagnet 58 controlling the 8 digital position is subsequently energized, and thereby only the contact points representative of that digital position are latched. Any latched contact points in any zone will remain latched for the passage of control current to a machine under control of the system until the sliding rod 24 of the particular storage zone is again operated to flex the contact point strips, at which time the latching flange 22 of the strip will be released from the influence of the latching lip 40 of the latching device 36, whereupon the latching device will return to its normal position under the influence of the resilient wire connection 48.

For ease of description, the magnets 32 may be referred to as column magnets, and the magnets 58 may be referred to as digit magnets. This description is purely arbitrary because it bears no fixed relation to the manner in which digits may be stored in the device.

It has been assumed herein that the storage device is adapted for use in an electric accounting or computing system in which perforated record cards are used to control the operation of accounting, computing or like machines. Herein has been illustrated in Fig. 4, a system in which the storage device is oriented for the column by column entry of data from a perforated record card and for concurrent readout from the storage unit for the operation of control magnets or the like. The versatility of the storage device is illustrated in Fig. 5 by orientation of the same in a control system wherein a perforated record card is sensed concurrently, i. e. all like digits are sensed simultaneously, and wherein the stored data is taken from the storage device by columns, i. e. all stored positions of a column are read simultaneously and successive columns are read in step by step order.

Figure 4:
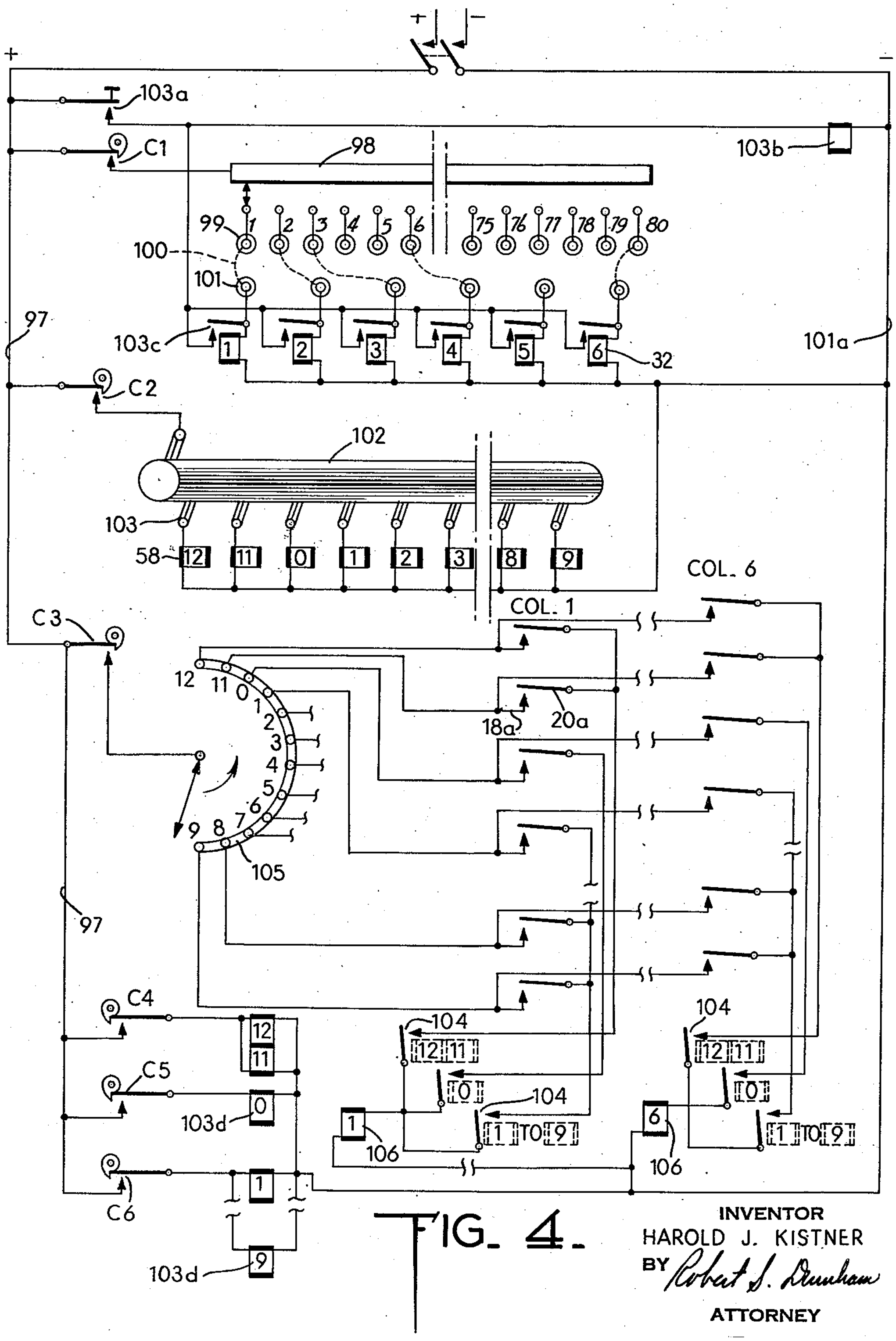
Fig. 4 is a circuit diagram for column by column entry and concurrent readout.
Figure 5:
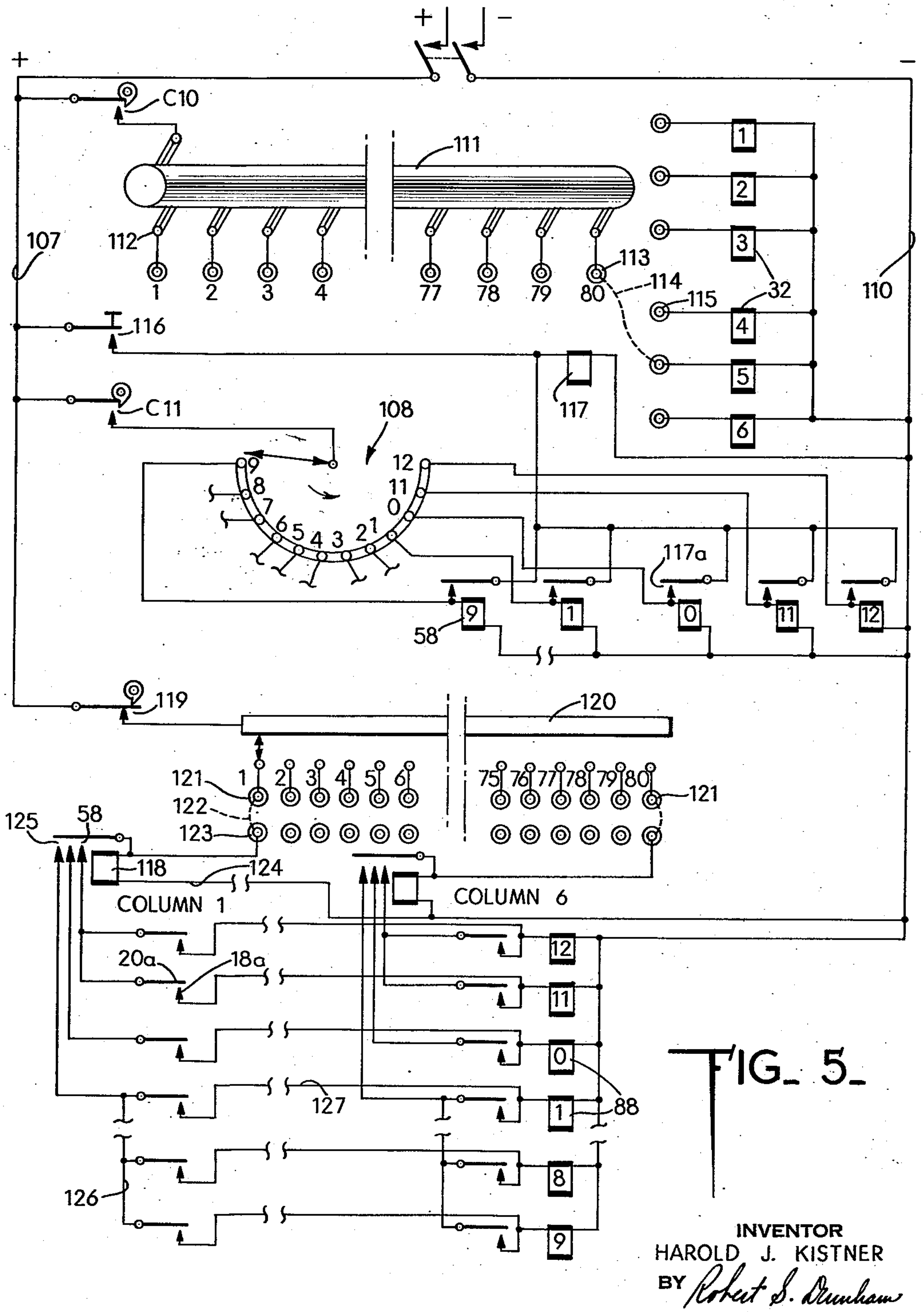
Fig. 5 is a circuit diagram for concurrent entry and column by column readout.

With more particular reference to Fig. 4, as a perforated record card is read column by column, a contact C–1 closes each time a given column is read. A circuit is established from the line 97, through the closed contact C–1, a column emitter 98, exit hubs 99, plug wires 100, entry hubs 101 to energize a selected column magnet 32 and from thence to the line 101*a*.

As a result of the circuit that has been established in this manner, the contact rod 24 under the influence of the energized magnet will be reciprocated and close all of the associated storage elements 16, of which 12 are shown herein as being disposed in alignment with each other. Following closure of the contact points of the contact elements under control of a given operating rod 24, a contact C–2 closes to permit circuits to be completed from the line 97, through the closed contacts C–2 to a contact roll 102, columnar alphabetic code holes in perforated record cards, brushes 103 and to the respective magnets 58, thereby rocking selected latch bails 54 and latching selected previously closed contacts into stored position. Upon deenergization of the magnets 32 and the consequent release of the operating rods 24, such selected latched contact points will remain latched in closed position while other contact assemblies that were not latched will be permitted to open.

Figure 6:
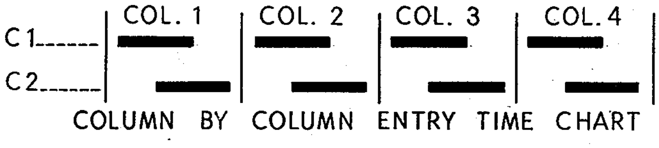
Fig. 6 is a timing chart for column by column entry.
Figure 7:
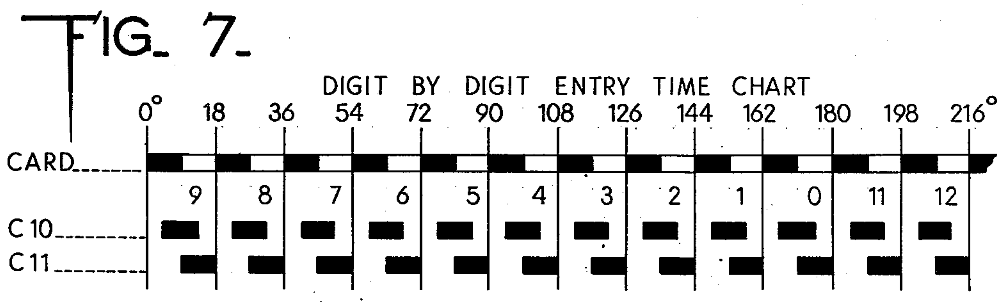
Fig. 7 is a timing chart for concurrent entry.
Figure 8:
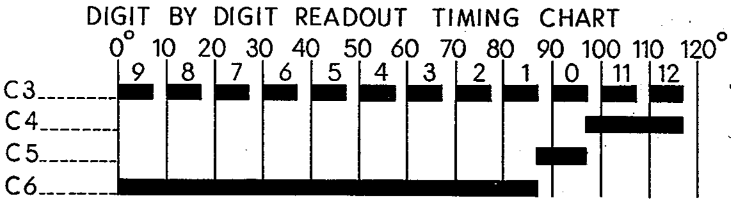
Fig. 8 is a timing chart for concurrent readout.

In a manner conventional to column by column sensing devices, the card is advanced to the next succeeding column and the storage cycle is repeated. Contacts C–1 and C–2 are timed rotating cam contacts or other mechanically actuated or magnetically actuated contacts, conditioned so that C–1 closes before C–2, as more particularly shown in the timing chart of Fig. 6.

Once information has been stored in the storage device, the same may be retained therein for repeated readout, but should it be desired to clear the storage device it is necessary merely to close a clear key 103a, which completes a circuit to a clear relay 103b. One associated clear relay contact 103c connects the clear key 103a to each of the column magnets 32 so that all contact operating rods 24 are operated to release latched contact assemblies and permit restoration of the latching bails 54 under the influence of the bail springs 48.

Concurrent readout of information stored in the storage device in the manner hereinabove described is achieved through the use of a digit emitter synchronized with a recording mechanism or the like, so that the storage device is scanned concurrently. Assuming that a "Z" is stored in column one, as may be done when the data is stored in column by column manner, the nine and zero impulses, for example, must be emitted to the magnet of the recording device that is connected to column one.

The first circuit completed is at the nine point of the impulse cycle by a cam contact C–6 to the 1–9 digit selection relay coils. This circuit is from line 97, contact C–6 to the digit selection relay pick-up coils 103d, to the line 101a. The points 106 of the selection relays are now closed so that a circuit at "9" time is completed from line 97, contact C–3, the 9 spot of the emitter 105, the closed 9 contact of column one of the storage device, the 1–9 column selection relay points 104 to the column one magnet 106 of a recording device or the like. The "9," whether numeric or part of an alphabetic code, set up in any other column of the storage unit will complete similar circuits at the same time as for column one.

The emitter 105 advances to the end of "1" time impulsing the recording control magnets 106 according to the setting of the storage unit. The contact C–6 opens to drop out the 1–9 selection relays 103d, and the contact C–5 closes to energize the zero digit selection relay 103d. Since zero is a part of the "Z" code in this example, when C–3 closes at "zero" time a circuit is completed from the line 97 through the contact C–3, through the zero spot on the emitter 105 and the closed zero contact of the storage unit, points of the zero digit selection relay 104 to the corresponding magnet 106 in column one that was energized for a "9." It should be noted that a different magnet could be employed for zone control in the recording device, but that only one magnet per recording column is used in this application, making use of the condition that would be present if a concurrent summary punch reproducer as shown in C. D. Lake, Reissue Patent Number 21,133, were used as the instrument under ultimate control, for example.

At the end of the zero impulse, C–5 opens to deenergize the zero selection relay 103d and cam contact C–4 closes to pick up the 12–11 digit selection relay 103d and the 12 and 11 zone storage circuits are conditioned for readout. The digit selection relays 103d prevent back circuits that would exist if the numerical and zone contacts were commoned and the alphabetic data were set up by closure of two contacts in any given column.

Concurrent entry into the storage device for column by column readout is required, for example, in the control of certain types of record card controlled tabulating machines where the card is sensed in concurrent fashion. By the use of a digit emitter as indicated in Fig. 5 of the drawings, entry may be made from a statistical record card instead of from a card read in flights.

It will be remembered that for column by column entry and concurrent readout, the magnets 32 were under the control of a timed impulse device, whereas the magnets 58 were under the control of card perforations. In order to adapt the storage device for concurrent entry and column by column readout, it is necessary to orient the storage device in the control system so that the magnets 32 are under the control of card perforations, whereas the magnets 58 are under the control of a timed impulse emitter, appropriate change in timing being made so that the contact assembly operating rods 24 are operated by their respective magnets 32 prior to the operation of the contact assembly latch bails 54. This timing sequence must prevail whether the information is stored in the storage device concurrently or whether it is stored in column by column manner.

Fig. 5 of the drawings diagrammatically illustrates a system wherein information may be sensed concurrently from a perforated record card and stored in the storage device for subsequent column by column readout. For example, near "9" card time a circuit is completed from the line 107, cam contact C–10, the "9" hole of a card, contact roll 111, brushes 112, exit hubs 113, plug wire 114, entry hubs 115, and the "9" magnet 32 to the line 110. This operates the "9" contact rod 24 and closes the associated contact points for all columns under card control. This is followed by a closure of cam contact C–11, which completes a circuit from the line 107 through the now closed cam contact C–11, the nine spot of the emitter 108, the nine digit magnet 58, and to the line 110. When this circuit is established, the contact assembly latches 36 will be rocked to latch in closed position the contact points of the respective "9" positions to be stored. The cam contact C–10 thereafter opens and breaks the circuit to the operating rod magnets 32 so that contacts for which latches were operated under the control of the timed emitter 108 remain latched, and contact assemblies that were not closed in latched position will reopen. When the control card advances to the next succeeding index point positions, the storage cycle is repeated in similar fashion.

After the desired data has been stored in the storage device, its stored condition will remain for repeated subsequent readout until the column magnets 32 are again energized. Upon such energization the latched contact assemblies are released and the device is conditioned for further storage. Clearing of a stored set-up is achieved by closure of a clear key 116, which energizes a clear relay 117, whose points 117a connect the clear key to each of the column operating rod magnets 32 so that all operating rods 24 are operated. Therefore, all of the contact assembly latches 36 and contact assemblies latched thereby are restored to their normal open position.

Because a separate contact is provided for each index point position for each column, the typical back circuits that have to be eliminated when more than one circuit connects to a given buss are herein eliminated by insertion of relay points 118. Assuming a "9" was stored in column one, the "9" contact in that column would be closed. The recording device that is advancing in column by column manner closes a circuit breaker contact (Fig. 5) to complete a circuit from line 107, the circuit breaker contact 119, a column emitter 120, the "1" exit hub 121, the plug wire 122, the entry hub 123, line 124, the selector relay coil 118 to line 110. Energization of the coil 118 distributes the circuit to the three points 125 of the relay. The point 125 at the left, as shown in Fig. 5 of the drawings, follows the common connection 126 from column one contacts "9"–"1" through "9" column contact, line 127 to the "1" magnet 88, which is under control of the closed storage point. Thus, the "9" magnet is adapted to operate a recording device such as a step by step duplicator summary punch as shown in Maul patents, Nos. 1,896,551 and 1,946,913, and Lee and Daley patent, No. 1,976,618.

The recording mechanism advances the column emitter 120 to the next columnar position so that similar circuits are completed for the next storage column in accordance with the code stored.

While the storage device has been illustrated herein as adapted to column by column entry and concurrent readout on the one hand, and to concurrent entry and column by column readout on the other hand, it is to be understood that the same may be utilized in other entry and readout systems. For example, its utility in systems requiring concurrent entry and concurrent readout on the one hand, and column by column entry and column by column readout on the other hand, is just as great as in the situations hereinabove described in detail. The application of Clair D. Lake et al., Serial Number 110,004, filed August 12, 1949, now Patent No. 2,573,581, issued on October 30, 1951, discloses a storage device of the same general category in these latter control systems, and the storage device of the instant application is similarly adapted.

Having described the invention in a mechanical embodiment, and having shown that embodiment in two operative systems, it is deemed that the nature and operation of the invention has been adequately described without resort to illustration of other systems in which the storage device may be useful. The practice of the invention is, therefore, not limited to the specific illustration, but the scope thereof is indicated in the following claims.

Having thus described my invention, I claim:

1. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electric storage zone, common means for simultaneously closing all the contact points of a plurality of storage elements constituting a given zone, and means thereafter operative to latch selected closed contacts of such zone in closed position.

2. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electric storage zone, common electromagnetically operated means for simultaneously closing all the contact points of a plurality of storage elements constituting a given zone, electromagnetically operated means thereafter operative to latch selected closed contacts of such zone in closed position, and means for impressing an electric impulse on contacts latched in closed position.

3. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electric storage zone, single electromagnetic means for simultaneously closing all the contact points of a plurality of storage elements constituting a given zone, electromagnetic means operative to latch selected closed contacts of such zone in closed position, and means for first selectively energizing said first named electromagnetic means and for thereafter selectively energizing said second named electromagnetic means.

4. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electrical storage zone, means for simultaneously closing all the contact points of a plurality of storage elements constituting a given zone, and a common latch operator associated with each element operative to select and latch closed contacts of such zone in closed position.

5. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electrical storage zone, common operating means for simultaneously closing all the contact points of a plurality of storage elements constituting a given zone, a common latch operator associated with each element operative to select and latch closed contacts of such zone in closed position, electromagnetic operating means for each of said operators, and means for impressing an electric impulse on contacts latched in closed position.

6. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electrical storage zone, electromagnetic means for simultaneously closing all the contact points of a plurality of storage elements constituting a given zone, a common latch operator associated with each element operative to select and latch closed contacts of such zone in closed position, electromagnetic means for operating each of said latch operators, and means for first selectively energizing said electromagnetic means and for thereafter selectively energizing said electromagnetic latch operating means.

7. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electrical storage zone, common means for simultaneously closing all the contact points of a plurality of storage elements constituting a given zone, a latch associated with each of said contact points, and a common latch operator for the latches of each element whereby closed contact points of each element may be latched in closed position.

8. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electrical storage zone, common electromatically operated means for simultaneously closing all the contact points of a plurality of storage elements constituting a given zone, a latch associated with each of said contact points, a common latch operator for the latches of each element whereby closed contact points of each element may be latched in closed position, electromagnetic means for operating each of said latch operators, and means for impressing an electrical impulse on contacts latched in closed position.

9. A storage device comprising a plurality of storage elements, each consisting of a plurality of pairs of spaced, normally open contact points in substantial alignment with corresponding normally open pairs of contact points of an adjacent element whereby aligned pairs of contact points of adjacent elements constitute an electrical storage zone, common electromagnetically operated means for simultaneously closing all the contact points of a plurality of storage elements constituting a given zone, a latch associated with each of said contact points, a common electromagnetic latch operator for the latches of each element whereby closed contact points of each element may be latched in closed position, and means for first selectively energizing said common electromagnetic means and for thereafter energizing said electromagnetic latch operators.

HAROLD J. KISTNER.

REFERENCES CITED

The following references are of record in the file of this patent:

UNITED STATES PATENTS

| Number | Name | Date |
| --- | --- | --- |
| 1,876,296 | Hofgaard | Sept. 6, 1932 |
| 2,019,704 | Hofgaard | Nov. 5, 1935 |